No. 818,357. PATENTED APR. 17, 1906.
T. A. DAVIS.
ANIMAL TRAP.
APPLICATION FILED NOV. 25, 1905.

2 SHEETS—SHEET 1.

Witnesses:
H. T. McKeever.
J. H. Mister.

Inventor:
Thomas A. Davis,
By Lane Bagger &Co
Attorneys

No. 818,357. PATENTED APR. 17, 1906.
T. A. DAVIS.
ANIMAL TRAP.
APPLICATION FILED NOV. 25, 1905.

2 SHEETS—SHEET 2.

Witnesses:

Inventor:
Thomas A. Davis,
By Lewis Bagger & Co.
Attorneys

UNITED STATES PATENT OFFICE.

THOMAS ALBERT DAVIS, OF FINDLAY, ILLINOIS, ASSIGNOR OF ONE-HALF TO WILLIAM W. HARBERT, OF FINDLAY, ILLINOIS.

ANIMAL-TRAP.

No. 818,357.     Specification of Letters Patent.     Patented April 17, 1906.

Application filed November 25, 1905. Serial No. 289,096.

*To all whom it may concern:*

Be it known that I, THOMAS ALBERT DAVIS, a citizen of the United States, residing at Findlay, in the county of Shelby and State of Illinois, have invented new and useful Improvements in Animal-Traps, of which the following is a specification.

My invention pertains to improvements in animal-traps.

It has for its object to provide for effectively entrapping and destroying mice, rats, skunks, minks, and the like and to accomplish this end in a simple and cheap manner; and it therefore consists of certain structural features, substantially as hereinafter fully disclosed, and particularly pointed out by the claims.

Figure 1:
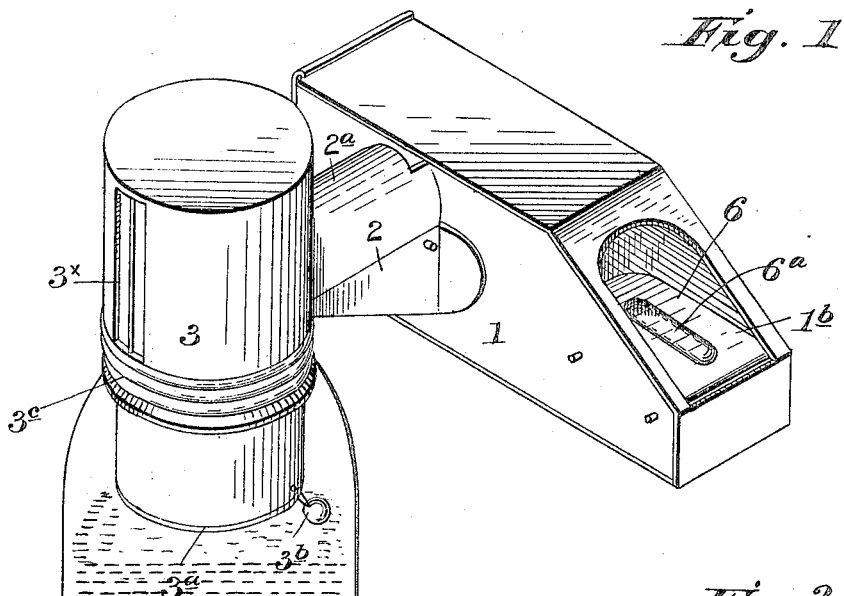
Figure 2:
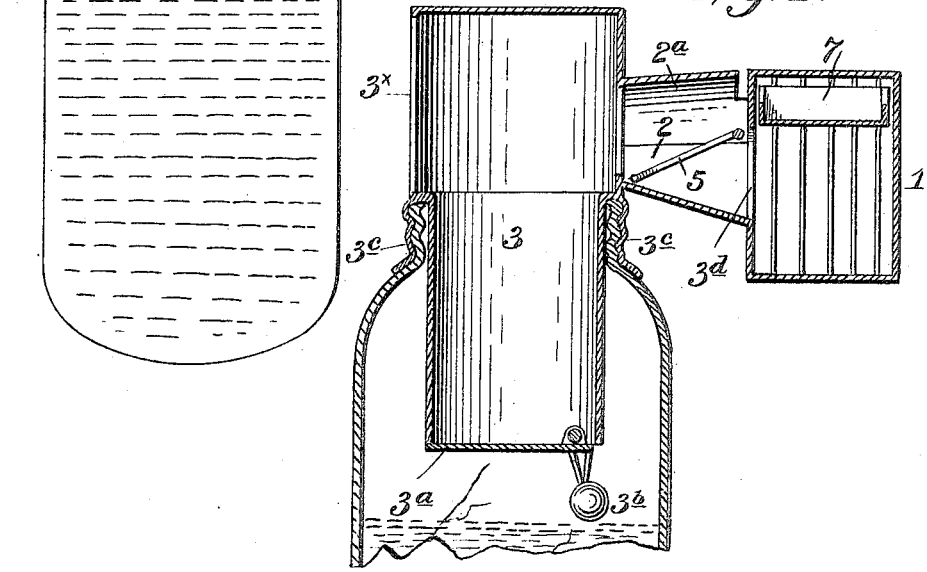
Figure 3:
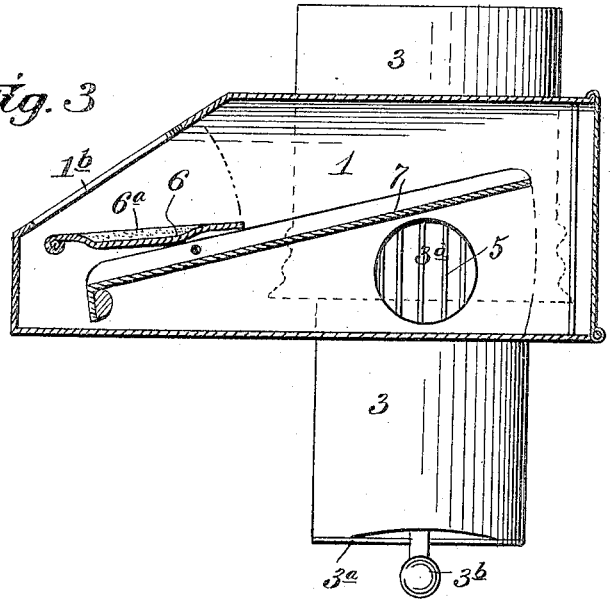
Figure 4:
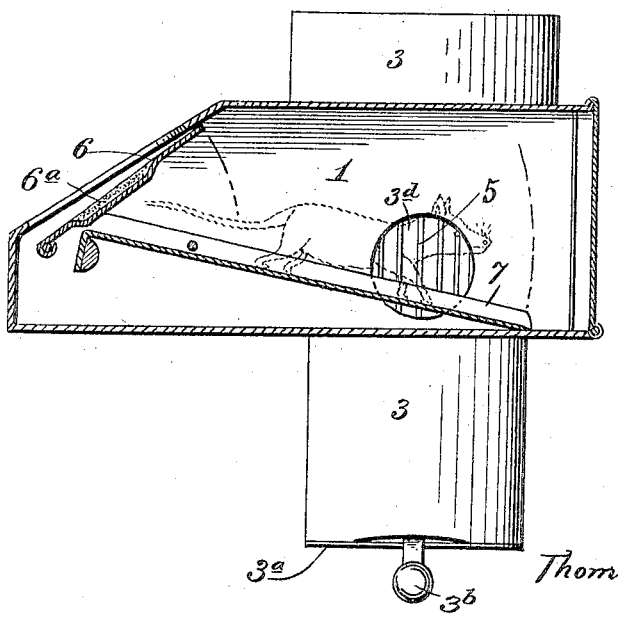

In the accompanying drawings, illustrating the preferred embodiment of my invention, Figure 1 is a perspective view showing one application thereof for use in connection with an ordinary glass jar containing in practice water as the destroying agent. Fig. 2 is a vertical section produced in a line passing through the point of application with the jar. Fig. 3 is a vertical longitudinal section taken through the trap proper. Fig. 4 is a like section showing the position the operative parts assume when the animal is entrapped.

In carrying out my invention I provide a receptacle or chamber 1, preferably of general rectangular outline or otherwise and having secured thereto at right angles a chute or passage forming adjunct or extension 2, itself having secured thereto a preferably cylindric vertical chamber or annex 3, the bottom $3^a$ of which is hinged or pivoted and weighted, as at $3^b$, to form a self-acting tilting platform. The annex or cylinder 3, closed at the top and having its upper portion preferably of a greater diameter than its lower portion and provided with a guarded opening $3^\times$ for the admission of light thereto to attract the entrapped animal, has an annular screw-threaded or fluted rim or flange $3^c$, offset from said lower portion and adapted to be screwed upon the upper beaded end or neck of a glass jar, which may be of the Mason type or otherwise and which is supplied with a suitable quantity of water for the purposes of this invention, as aforesaid. The passage-way or chute 2 between the chambers or receptacle 1 and the cylinder 3 is suitably covered or closed from above, preferably by a plate or closure $2^a$ suitably fixed or secured to these parts, the same being preferably adapted or improvised to provide for the admission to the thus closed or canopied chute 2 of additional light for the purpose aforesaid. Within said chute, whose bottom is inclined upward and outward toward the cylinder 3, is arranged a gravity-actuated slatted guard or flap 5, oppositely inclined to said bottom and hinged or pivoted at its upper end at a point above the passage-way $3^d$ between the chamber 1 and said chute, while its lower end rests upon said chute-bottom, near the outer or upper end thereof, to prevent the return of the entrapped animal, as is apparent.

Within the receptacle or chamber 1 is suitably arranged a pivoted platform or plate 6, upon which the animal steps upon entering the former, the entrance-opening $1^b$ of said receptacle being preferably formed in the forward end plate thereof, which is inclined inward and upward to induce the ready stepping of the animal upon said platform, as will be apparent. Said platform, formed with a depression or hollow $6^a$ at its forward end for conveniently receiving the bait, extends only a short distance forward, and 7 is a second pivoted or tilting platform with its rear end underlying the forward end of the aforesaid platform and its forward end reaching to a point just beyond the distant side of the passage-way or opening $3^d$ in the receptacle or chamber 1 to permit the captured animal to pass from the platform through said opening. The extreme forward end of said platform is guarded by a series of rods suitably fixed within said chamber or receptacle contiguous to said end of platform, the forward or corresponding end of the receptacle being open for the admission of light for obvious reasons. It will be noted that the free or forward end of the platform 6 is initially retained in horizontal position by causing it to rest upon the pivot-rod of the platform 7. Consequently as the animal travels thereon and until it steps upon the latter platform said platform 6 will still occupy such position, as is necessary. Instantly, however, the animal leaves the platform 6 and steps upon the platform 7 the latter will be tilted by the weight of the animal thereon and the rear end thereof elevate the forward end of the platform 6, and thus retain it in front of the entrance-opening 1ᵇ of the receptacle 1, thereby cutting off the retreat of the animal or its escape in that direction, frightening it forward, whence it will seek to escape through the opening 3ᵈ and pass on through the chute 2. The animal will thus raise and pass under the gravity guard or flap 5, and its return being further blocked it will be further frightened forward, when it will plunge down through the cylinder-chamber 3, whose pivoted or gravity-actuated bottom will open under the weight of the animal and let it drop into the water in the jar, resulting in the drowning of the animal.

It is herein observed that by thus disposing of the animal the trap is maintained always in a cleanly or proper sanitary condition and free from any smell or odor which would arise if the animal were held or retained therein until released or removed, as is obvious; also, that by suitably securing the trap in place in the required locality it may be used to capture skunks, minks, or like animals, as is apparent.

I claim—

1. A trap of the character described, comprising a receptacle equipped with interacting tilting platforms, a chamber closed at its upper end and povided with an offset annular flange or extension, means forming a passage-way between said receptacle and said chamber, and a liquid-containing vessel, said flange having a screw-threaded surface for effective connection with said vessel.

2. A trap of the character described, comprising a receptacle equipped with interacting tilting platforms, a chamber closed at its upper end and provided with an offset annular flange, a passage-way between said receptacle and chamber, constituted of a covered chute having an upward and outward inclined bottom and a gravity-actuated flap or guard arranged therein, and a liquid-containing vessel, said annular flange having a screw-threaded surface for effective connection with said vessel.

3. A trap of the character described, comprising a receptacle equipped with interacting pivoted platforms, a chamber closed at its upper end and provided with an offset annular flange or extension, a covered chute forming a passage-way between said receptacle and said chamber and having an upward and outward inclined bottom and a gravity-actuated flap or guard, and a liquid-containing vessel equipped with a gravity-actuated valve or bottom, said annular flange having a screw-threaded surface for effective connection with said vessel.

In testimony whereof I affix my signature in presence of two subscribing witnesses.

THOMAS ALBERT DAVIS.

Witnesses:
G. W. ELMORE,
W. W. HARBERT.